(12) United States Patent  (10) Patent No.: US 6,460,743 B2
Edgerly et al.  (45) Date of Patent: Oct. 8, 2002

(54) METHOD AND APPARATUS FOR PROVIDING A ROOF-MOUNTED UPRIGHT BICYCLE CARRIER

(75) Inventors: Jeffrey R. Edgerly, Bristol; William Fortune, Branford, both of CT (US)

(73) Assignee: Industri AB Thule (SE)

( * ) Notice: Subject to any disclaimer, the term of this patent is extended or adjusted under 35 U.S.C. 154(b) by 0 days.

(21) Appl. No.: 09/805,369

(22) Filed: Mar. 13, 2001

(65) Prior Publication Data

US 2002/0125279 A1 Sep. 12, 2002

Related U.S. Application Data

(60) Provisional application No. 60/189,071, filed on Mar. 13, 2000.

(51) Int. Cl.$^7$ ............................ B60R 9/048; B60R 9/045
(52) U.S. Cl. ........................ 224/324; 224/552; 224/571; 224/924
(58) Field of Search .................. 224/552, 924, 224/571, 324; 211/19, 20, 23

(56) References Cited

U.S. PATENT DOCUMENTS

| | | | | |
|---|---|---|---|---|
| 556,789 A | | 3/1896 | Walker | |
| 603,422 A | | 5/1898 | Burkhardt | |
| 3,176,903 A | * | 4/1965 | Farley | ......................... 224/490 |
| 3,367,548 A | | 2/1968 | Cooper | |
| 3,529,737 A | * | 9/1970 | Daugherty | .................. 224/924 |
| 3,581,962 A | * | 6/1971 | Osborn | ........................ 211/22 |
| 3,744,689 A | * | 7/1973 | Kjensmo | ..................... 224/497 |
| 3,863,767 A | * | 2/1975 | Garwood | ..................... 211/20 |
| 4,015,718 A | | 4/1977 | Bernard | |
| 4,437,597 A | | 3/1984 | Doyle | |
| 4,767,037 A | * | 8/1988 | DeLellis | ..................... 224/518 |
| 4,852,779 A | * | 8/1989 | Berg | ........................... 211/21 |
| 5,301,817 A | * | 4/1994 | Merritt | ........................ 211/20 |
| 5,570,825 A | * | 11/1996 | Cona | .......................... 224/495 |
| 5,692,659 A | | 12/1997 | Reeves | |
| 5,735,410 A | | 4/1998 | Kallstrom | |
| 5,743,411 A | | 4/1998 | Hawkes | |
| 5,820,002 A | * | 10/1998 | Allen | ........................... 211/70 |
| 5,833,074 A | * | 11/1998 | Phillips | ........................ 211/17 |
| 5,988,403 A | | 11/1999 | Robideau | |
| 5,992,645 A | * | 11/1999 | West | ........................... 211/19 |
| 6,047,869 A | * | 4/2000 | Chiu | .......................... 224/314 |
| 6,053,336 A | | 4/2000 | Reeves | |
| 6,241,104 B1 | | 6/2001 | Kraus | |
| 6,244,483 B1 | * | 6/2001 | McLemore et al. | ......... 224/521 |
| 6,336,562 B1 | | 1/2002 | Mori | |

FOREIGN PATENT DOCUMENTS

| | | |
|---|---|---|
| GB | 31326 | 8/1931 |
| GB | 360163 | 11/1931 |

OTHER PUBLICATIONS

Sportworks "Bob Ratchet Roof Top Rack Installation & Guide for Use" Copyright 2000.
Sportworks "Transport Series Installation & Guide for Use", Copyright 1998.

* cited by examiner

*Primary Examiner*—Stephen P. Garbe
(74) *Attorney, Agent, or Firm*—Howrey, Simon, Arnold & White, LLP

(57) ABSTRACT

Apparatus and method for transporting a bicycle in a substantially upright orientation. The method includes positioning a bicycle in a carrier so that a wheel of the bicycle is located in a trap space of the carrier. The trap space is configured to maintain the bicycle in a substantially upright orientation when the wheel is located therein and the carrier is in a released configuration. This permits the operator to use both hands to secure the bicycle in the carrier. The wheel of the bicycle, and typically the front wheel, is fixed in the carrier by applying a squeeze force upon the wheel and thereby establishing a securing configuration of the carrier. Preferably, the squeeze force is imposed across a perimeter of the wheel and the actuators for imposing the squeeze force are positioned low enough to be within the typical user's reach, also referred to as the reach zone, when the carrier is mounted on the roof-top of a carrying vehicle.

19 Claims, 4 Drawing Sheets

METHOD AND APPARATUS FOR PROVIDING A ROOF-MOUNTED UPRIGHT BICYCLE CARRIER

RELATED PATENT APPLICATIONS

This patent application claims priority to U.S. Provisional Application No. 60/189,071 filed Mar. 13, 2000 entitled ROOF-TOP MOUNT UPRIGHT CARRIER, the disclosure of which is expressly incorporated herein in its entirety.

TECHNICAL FIELD

The present invention relates generally to load carriers, and more specifically to bicycle carriers designed to transport bicycle(s) in an upright orientation, preferably in a roof-mount configuration above a transporting vehicle.

BACKGROUND ART

Roof mounted load carriers are well known in the load carrier arts for carrying different types of cargo. In the case of sports equipment which is often too large to fit inside the carrying vehicle, specially configured carriers have been designed for transporting the bicycles in an upright configuration above the roof of the vehicle. Considering currently available designs, there are several deficiencies which can cause consumers to avoid their use. Most of these deficiencies stem from the location of roof-mounted carriers; by their nature, they are often difficult to reach by the average user because of the significant height above ground level at which they are positioned. In order to install a bicycle in such a roof-top carrier, the user must raise the bicycle at least to shoulder height, and oftentimes, overhead lifting is even required depending upon the user's height.

Even though many bicycles are now of lightweight design, their remaining weight and bulk can be unwieldy and difficulty to control in this awkward lifting procedure that must be executed by the user. Still further, it should be appreciated that in order to position the bicycle above the vehicle and onto the roof-top carrier, it is usually required that the arms of the user be in an almost fully extended position, not only because of the height of the carrier, but also in order to move the bicycle, at the elevated height, from the side of the vehicle where the user is standing, to the load position over the vehicle's roof surface.

In conventionally designed roof-top bicycle carriers, once a bicycle is located in the carrier above the roof, the user must maintain a grip on the bicycle to maintain its balance in the upright position while securement mechanisms are fastened thereto. This can present extreme hardship not only because of the awkward position at which the bicycle is positioned with respect to the user, but also because both hands are typically otherwise needed to manipulate the securing mechanisms. Requiring one hand to be utilized just to maintain the balance and orientation of the bicycle is a significant drawback to the user when these conventional roof-top carrier designs are considered.

In another aspect, conventionally designed roof-top bicycle carriers are asymmetrically constructed. That is to say, a particular carrier has been designed to be mounted on one side of the vehicle, and not the other. This stems from the fact that fastening actuators are positioned at the side of the carrier so that they are easier to reach from the position of the user beside the vehicle. The drawback of providing this convenience to the user, however, is that the utilization of the carrier is in turn limited. More particularly the carrier is not interchangeable with respect to the two sides of the vehicle; form either of which the user may desire to load a bicycle. Still further, many current designs for roof-top carriers place the actuating mechanisms high, at locations difficult to reach and manipulate by the user.

Because roof-top bicycle carriers typically have wheel trays in which a carried bicycle rests, securement is often accomplished by fasteners secured about the wheels and tray. This type of securement leaves the bicycle at risk of unauthorized removal. In most bicycle designs, quick releases are provided for removing at least the front wheel and can actually facilitate an authorized removal of the bicycle from such tray securement schemes.

In view of the above described deficiencies associated with the use of known methods and designs for roof-top, upright bicycle carriers, the present invention has been developed. These remedial aspects, as well as further enhancements and benefits are described in greater detail hereinbelow with respect to several alternative embodiments of the present invention.

DISCLOSURE OF THE INVENTION

The present invention in its several disclosed embodiments alleviates the drawbacks described above with respect to the conventionally designed roof-top, upright bicycle carriers, while at the same time providing several additionally beneficial features. Each of the deficient aspects of conventional designs described hereinabove are addressed by the present carrier. Initially, a trap space is utilized in the carrier and in which, once a bicycle is installed, its upright orientation is independently maintained. This accomplishes one of the most consumer influential benefits of the present carrier; that is, after the bicycle is installed, the user may release the bicycle altogether thereby freeing both hands so that the securement and locking procedures can be focused upon. No longer does the user have to perform a balancing act with respect to the bicycle while trying to fasten the securement and lock mechanisms.

The present carrier is designed to have a substantially symmetrical design. In this regard, actuating mechanisms are provided on both sides of the carrier so that the carrier can be located at either side of the vehicle's roof. This also avoids the user having to reach across the carrier to execute securing and releasing procedures. As a further accommodation, the portions of the actuating mechanisms which must be grasped by the user are positioned in an easy "reach zone." That is, the actuating mechanisms are positioned low on the carrier, close to the roof-top surface of the vehicle enabling easy reach by the user. This reach zone is generally considered to be within one to eight inches of the roof rack members to which the carrier is mounted.

In another aspect, the design of the present invention maintains the wheel receiving tray of the carrier clear during the initial stages of installing the bicycle into the carrier so that the rolling capability of the bicycle can be capitalized upon in the loading process. An often complained about condition is that the tray of conventional roof-top bicycle carriers is obstructed during the loading process and therefore the bicycle cannot be rolled in the track into proper position for securement. Because the brace component of the current invention is configured for a conformance fit down into the wheel tray during initial load, the bicycle does not have to be positioned with exactness into its final resting position. In fact, the bicycle can be initially loaded at any location along the tray and rolled into proper position over the wheel engaging portion of the bracing arrangement and into the trap space for securement.

In yet another aspect, lock mechanisms are provided not only for securing the carrier to the rack system of the carrying vehicle, but cable locks are also provided so that a securement cable can be snaked or looped through the bicycle and then locked to the load carrier. In a preferred embodiment, these functions are combined at a single flip-handle component. At a minimum, however, if more than one lock assembly is utilized, the several lock cylinders are commonly keyed so that the user only needs a single key for unlocking both the bicycle securement and the carrier securement arrangements.

Hereinbelow, several illustrative embodiments and preferred aspects of the present invention are described. Individually and collectively, each should be considered in their exemplary capacity, and not as requirements outside of those expressly required in the claims appended herewith.

In at least one embodiment, the present invention takes the form of a method for transporting a bicycle in a substantially upright orientation. The method includes positioning a bicycle in a carrier so that a wheel of the bicycle is located in a trap space of the carrier. In this regard, it should be appreciated that bicycle wheels are predominantly referenced herein with respect to the invention; it should be understood that usually full wheel assemblies are intended by this terminology, including a pneumatic tire. The trap space is configured to maintain the bicycle in a substantially upright orientation when the wheel is located therein and the carrier is still in a released configuration. This permits the operator to use both hands to secure the bicycle in the carrier. The wheel of the bicycle, most typically the front wheel of the bicycle, is fixed in the carrier by applying a squeeze force upon the wheel which establishes a securing configuration of the carrier. Preferably, the squeeze force is imposed across a perimeter of the wheel and the actuators for imposing the squeeze force are located low enough to be within the typical user's reach. The suitable area in which the actuators may be located is referred to as the reach zone. In general terms, the reach zone is defined as a vertical distance between one and eight inches above a load bars of the vehicle's rack system to which the carrier is mounted.

Preferably, a pair of actuators are provided, one each on opposite lateral sides of the carrier and each is capable of independently imposing a proper squeeze force on the wheel of the bicycle. In this way, installation of the carrier is accommodated at either side of the carrying vehicle and the user is prevented from having to reach across the carrier for actuation purposes, regardless of the side of the vehicle upon which the carrier is mounted.

The squeeze force is imposed so that a predominant component of the squeeze force is vertically oriented and downwardly directed in the securing configuration. In this manner, the support of the tray in which the trapped wheel rests is advantageously utilized in establishing the trap space.

The trap space is defined, at least partially, underneath a trap arrangement that is configured to be manipulated between released and securing configurations. The trap arrangement includes a closed-top portion that is arranged for pressing engagement upon the wheel. As illustrated, the closed-top portion is substantially formed as an inverted U-shaped assembly.

A telescoping function is provided in the trap arrangement thereby facilitating extension and retraction of a bite portion of the closed-top portion for transitioning the trap arrangement between the released and securing configurations. As shown, an extension member is telescopically positioned within a sleeve and an actuator is utilized to translate the extension member within the sleeve for transitioning the trap arrangement between the released and securing configurations.

Telescopic action of the extension member is driven by pivotal movement of the actuator. The sleeve is provided with an access slot therethrough for accommodating extension of the actuator across the sleeve to the extension member. The extension member is spring biased within the sleeve for assuring proper relative positioning between the extension member and the sleeve to for initial engagement of the actuator with the extension member. An insert pin is provided on the actuator and is configured to extend across the access slot and be insertibly engaged in a receiving aperture in the extension member. The spring bias function is tuned to assure proper alignment between the access slot and the receiving aperture for acceptance of the insert pin.

To optimize user operation of the actuator, an indicator is utilized showing an intended area of application of a user's hand grip upon the actuator. Preferably, the indicator is configured like a bicycle handlebar-style grip. An end cap portion of the indicator fixedly connects to a wheel engaging portion of a bracing arrangement of the carrier and pivotally connects to a support portion of the bracing arrangement. These connections facilitate transition between the released, the securing and a non-bicycle-transporting, folded-down configuration of the carrier.

The trap arrangement includes a macro-adjustment arrangement adapted to be variously configured for accommodating entrapment of differently sized bicycle wheels. A macro-adjustment member of the arrangement is configured for sliding movement within the trap arrangement between a plurality of indicated discreet locations, each of such locations being arranged to accommodate application of a substantially uniform squeeze force upon differently sized bicycle wheel. A stop arrangement is provided at the macro-adjustment member for relatively fixing the member with respect to the trap arrangement. The adjustment may be continuously variable, but is preferably limited to discreet and selectable locations. In the instance of discreet locations, a pin-in-selected-aperture mechanism may be advantageously utilized.

The trap space is at least partially defined adjacent to a bracing arrangement that is also configured to be manipulated between released and securing configurations. A brace force is imposed on the bicycle wheel having a first component that is vertically oriented and directed upwardly. A second component is horizontally oriented and directed toward the trap arrangement. The bracing arrangement has a wheel engaging portion that is arranged for pressing engagement upon the wheel. In a preferred embodiment, the wheel engaging portion is formed from a band having sufficient width to avoid becoming embedded in the wheel's tire tread.

The actuator is arranged between the bracing arrangement and the trap arrangement and is configured to transition both the bracing arrangement and the trap arrangement between released and securing configurations. The bracing arrangement is controlled utilizing a ratchet mechanism that is configured to fix the bracing arrangement in the securing configuration under a biasing action imposed by the squeezed wheel. This biasing action is derived from the reaction or spring-back force of the wheel and tire responsive to the squeeze force being exerted thereupon by the trap and bracing arrangements.

The bracing arrangement is configured so that in a bicycle receiving configuration, at least a portion of the arrangement fits substantially flush within the wheel receiving tray thereby permitting rolling access of the wheel into and out of the trap space during initial load and final unload stages.

A lock arrangement is provided that secures the carrier to a load bar of a carrying vehicle and anchors a securing cable connectable through the bicycle. If one locking mechanism is utilized, then of course only one key is required for operation of the lock. If more than one lock mechanism is utilized, however, the several lock arrangements are commonly keyed so that still, only one key is required for performing all unlocking functions of the total lock arrangement.

The beneficial aspects described above apply generally to the exemplary devices and methods disclosed herein regarding the upright bicycle carrier. The specific structures and steps through which these benefits are delivered will be described hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
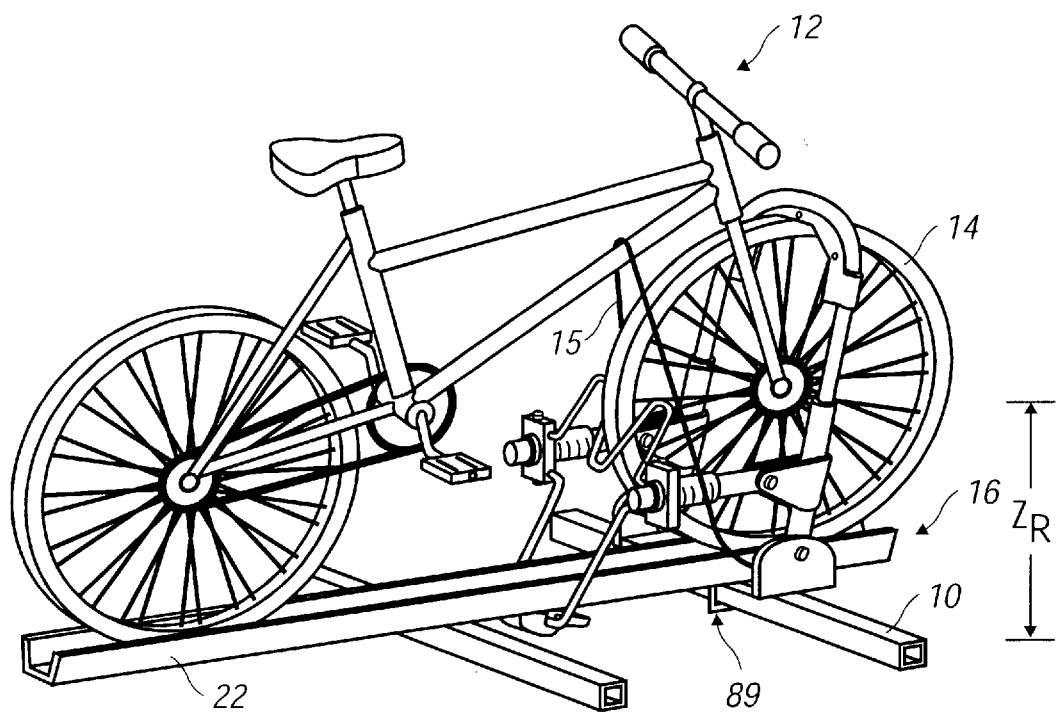
FIG. 1 is a perspective view of a carrier constructed according to the present invention with a bicycle installed and secured in a trap space thereof.

Referring to the Figures, FIG. 1 illustrates a bicycle 12, having a front wheel 14, installed in a roof-top carrier 16. The carrier 16, including a base portion for 10 a roof-top rack system that is mounted to a carrying vehicle. The wheel assembly 14 of bicycle 12 is consistently referred to herein as wheel 14, but it should be understood that the terminology of "wheel" 14 includes other incidental components of a bicycle wheel assembly, including the tires, spokes and hub. As is typical in many roof-top mounted carriers, a wheel tray 22 is included that is mounted to a base plate 84 that is securable and lockable to the vehicle's rack system.

A trap space 24 is defined between several components of the carrier 16. It is within the trap space 24 that the wheel 14 of the bicycle 12 is located for upright securement purposes.

Figure 2:
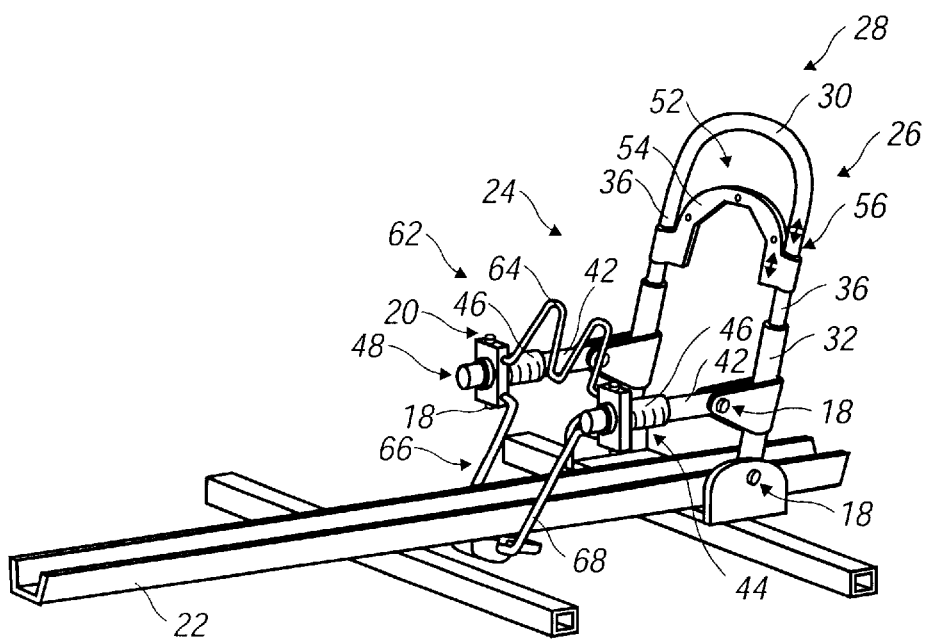
FIG. 2 is a perspective view of the carrier of FIG. 1 without a bicycle and showing the macro-adjustment arrangement configured to secure a small-wheeled bicycle.

Referring to FIGS. 1 and 2, a trap arrangement 26 is shown that is utilized for squeeze fitting about the wheel 14 and establishing boundaries of the trap space 24. The trap arrangement 26 affects a squeeze action using a telescoping arrangement that includes a telescoping member 36 that reciprocates within two sleeves 32. The telescoping member 36 is formed as an inverted U-shape, including a closed-top portion 28 having a bite portion 30. In general, the downwardly extending legs of the telescoping member 36 extend into the sleeves 32 and are arranged for translational movement therein.

A macro-adjustment arrangement 52 is provided at a top end of the trap arrangement 26. The macro-adjustment arrangement 52 is provided to facilitate the squeeze action on differently sized wheels 14. Bicycle wheels 14 come in standard sizes and it is desirable to be able to secure each of those different sizes in the carrier 16. So that a substantially uniform squeeze force can be imposed on the wheel 14 regardless of its size, the macro-adjustment arrangement 52 is provided in the form of a sliding member 54 that, by the sliding connection 56, is arranged for reciprocation within an upper region of the telescoping member 36.

It is contemplated that the macro-adjustment arrangement 52 could be continuously and variably adjustable along this upper region of the member 36. Since the typical sizes of bicycle wheels are known, however, a stop arrangement 58 has been contemplated to be advantageously included in the form of a spring biased pin-in-selected-aperture configuration 60. In this regard, several apertures 37 are provided along the telescoping member 36 and which correspond to specific wheel size accommodation. In this manner, a fit guide for the user can be utilized that prescribes proper positioning of the sliding member 54 for specific wheel sizes. Still further, because of the narrowed interior space bounded by the sliding member 54, the trapping aspect of the arrangement 26 is enhanced and the wheel assembly 14 is confined in the secured configuration, even in the event that the tire of the wheel assembly 14 goes flat.

Figure 3:
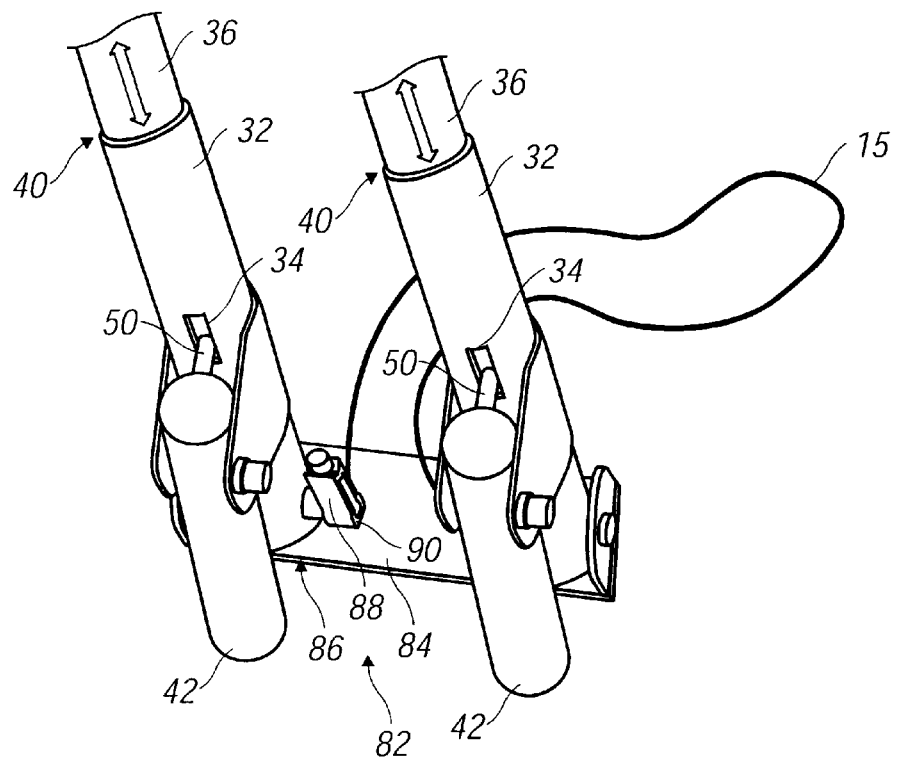
FIG. 3 is a detailed perspective view, from an upper position, depicting the operation and interaction of the actuator with the trap arrangement.

A pair of actuators 42 are pivotally connected at connections 18, one each to each of the sleeves 32. As may be appreciated in FIG. 3, each actuator 42 includes an insert pin 50 at its distal end adjacent to a respective sleeve 32. Each sleeve 32 has an access slot 34 extending therethrough and exposing a receiving aperture in the telescoping member 36. The access slot 34 has a long axis that is in substantially parallel orientation with respect to a long axis of the sleeve 32. A positioning spring 38 is provided for biasing the telescoping connection 40 to a proper configuration which aligns the access slot 34 over the receiving aperture in the telescoping member 36. Based on this alignment, as the insert pin 50 is pivoted into engagement with the receiving aperture in the telescoping member 36, the squeeze action of the trap arrangement 26 is initiated. Therefore, from the arrangement of FIGS. 2 and 3, it may be appreciated that as the insert pin 50 is pivoted downward, the telescoping member 36 is also move downward causing the imposition of the squeeze force on the wheel 14 of the bicycle 12.

The actuator 42, based on the pivot connection 18 to the sleeve 32, acts as a lever and therefore optimal operation can be achieved by proper positioning of the user's hand during use. To that end, grip location indicator 44 is provided substantially at an opposite end of the actuator 42 away from the insert pin 50. To better facilitate the user's grasp of the actuator 42, the indicator 44 is configured as a handle grip 46. The handle grip 46 is constructed substantially similar to a bicycle's handlebar grip. That is, it is constructed from a resilient material like rubber and preferably, with an exteriorly knurled or ribbed design.

Near the left-hand end of the actuator 42, the handle grip 46 has an end cap portion 48 that is configured for making connection to components of a bracing arrangement 62. The bracing arrangement 62 can best be appreciated in FIG. 2. Therein, a wheel engaging portion 64 is shown that cooperates with a support portion 66. The wheel engaging portion 64, which is shown to be formed from a M-shaped wire or band segment, is connected to the end cap 48 of the handle grip 46 by a fixed connection 20. Conversely, the support portion 66 is connected by a pivot connection 18 to the handle grip 46.

Figure 4:
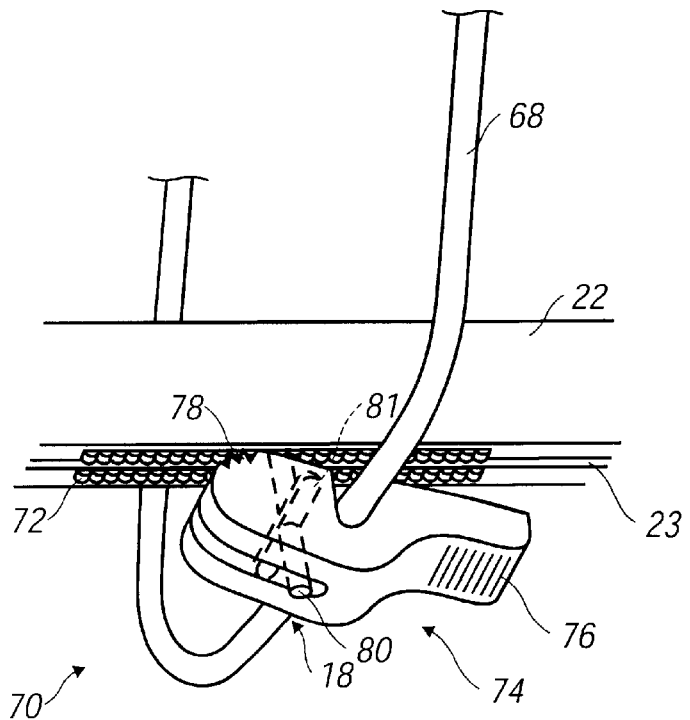
FIG. 4 is a detailed perspective view, from an lower position, depicting the operation and interaction of the ratchet and paw mechanism.
Figure 5:
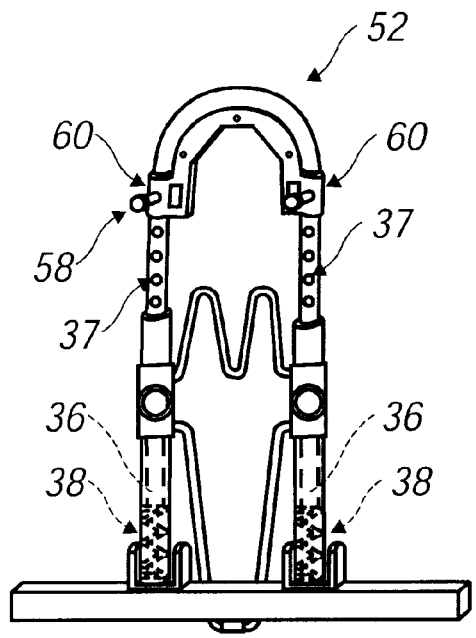
FIG. 5 is an elevational view showing the cooperation of the spring biased telescoping member in the sleeves.

The support portion 66 includes a U-shaped support member 68 that is controlled by a ratchet mechanism 70. The ratchet teeth 72 of the mechanism 70 are provided at the lower surface of the wheel tray 22. This arrangement is best appreciated in FIG. 4 where a pivoting paw member 74 is shown pivotally connected to a bite portion of the support member 68. The paw 74 includes an actuatable portion 76 that is adapted with a friction surface anticipating manual engagement by the user. Engaging portion 78 is provided opposite thereto and is adapted for ratcheting engagement upon the teeth 72.

A positioning pin 80 assures proper location and travel of the paw 74. The pin 80 is substantially formed as a double crossed "T" with the top cross-member slidingly positioned in a track formed at the bottom of the tray 22 and the middle cross-member that is pivotally engaged with the body of the paw 74. Only a bottom portion of the "T" is visible in FIG. 4. In this manner, the paw 74 is maintained at a proper distance with respect to the ratchet teeth 72 and prevented from moving completely away therefrom. The connection of the support member 68 to the paw 74 is lengthwise offset from the connection of the positioning pin 80 to the paw 74. The offset configuration is such that downward pressure on the paw 74 by the support member 68 causes the engaging portion 78 of the paw 74 to be biased upward toward the ratchet's 70 teeth 72.

It is contemplated that the ratchet teeth 72 may only be provided in the operational range indicated in FIGS. 1 and 2. That is to say, while the track for the pin 80 is provided along a substantial portion of the tray 22, ratchet teeth are not necessarily needed where the paw member 74 is located when the support member 68 is folded back toward the trap arrangement 26.

Figure 6:
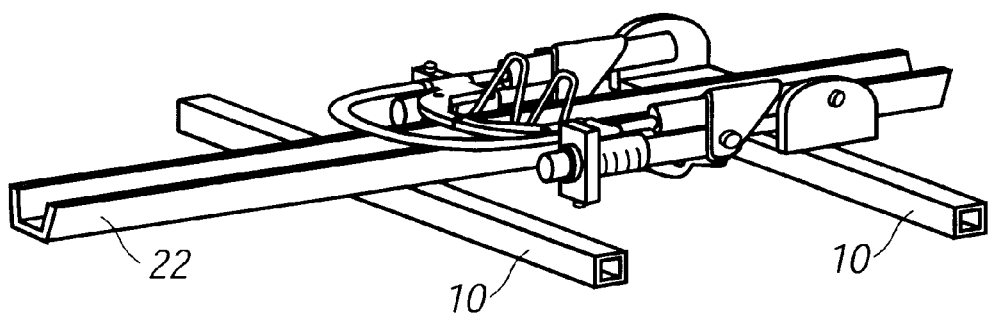
FIG. 6 is a perspective view of the carrier of FIG. 1 in a folded configuration for presenting a minimized profile when a bicycle is not being transported.
Figure 7:
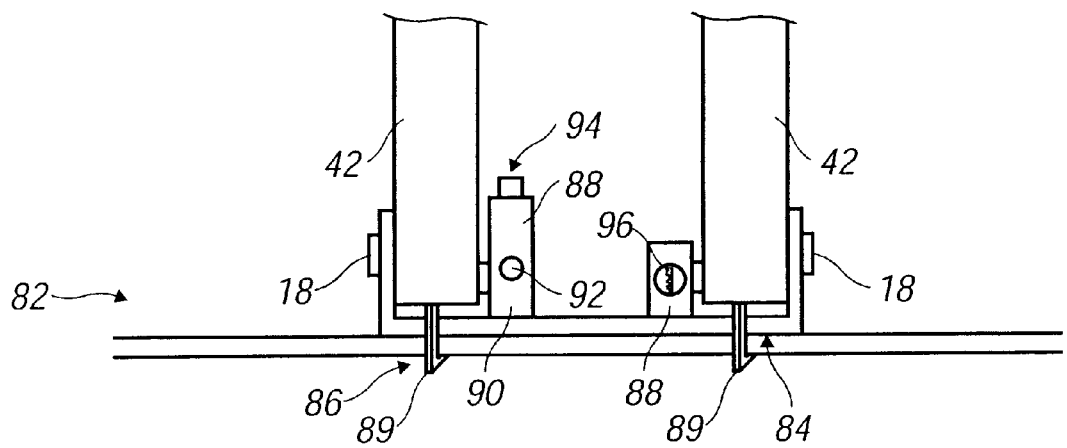
FIG. 7 is a schematic view of the anchor arrangement showing two exemplary locking mechanisms.

In operation, the carrier 16 is initially expanded from the folded configuration typified in FIG. 6 so that the trap arrangement 26 is moved to a substantially upstanding orientation. The bracing arrangement 62 is configured so that the wheel engaging portion 64 is located down in the wheel tray 22 in a substantial conformance fit therewith. In this configuration, the support member 68 has been moved from an original, folded position in which it was extending toward the front, or right end of the tray toward the back or left end of the tray 22. At this stage, the left-hand end of the actuator 42 is positioned close to tray-level. With respect to the ratchet mechanism 70, the ratchet teeth 72 are configured to permit free travel of the paw 74 toward the trap arrangement. The teeth 72, however, prevent free travel of the paw member 74 away from the trap arrangement when the paw member 74 is in the toothed zone and the engaging portion 78 is biased toward the teeth 72.

The bicycle 12 is then loaded onto the carrier 16 so that the wheel 14, as well as the back wheel of the bicycle 12 are installed in the tray 22. Because the wheel engaging portion 64 is folded down into the tray 22, the bicycle may then be rolled forward toward the trap arrangement 26. Forward progress of the bicycle 12 is stopped when the wheel 14 engages the sliding member 54 of the macro-adjustment arrangement 52. Hands-free location of the bicycle 12 in the carrier 16 is accomplished at this stage.

The left-hand end of the actuator 42 is then raised by the user by grasping the handle grip 46 and lifting. At the same time, the support member 68 is moved toward the front of the bicycle 12 and into engagement with the ratchet teeth 72. As a consequence, the wheel engaging portion 64 of the bracing arrangement 62 engages the backside of the wheel 14. As may be appreciated in FIG. 3, as the actuator 42 is coming into this substantially horizontal orientation, the insert pin 50 extends through the access slot 34 in the sleeve 32 with a distal end thereof coming into inserted engagement with the receiving aperture in the telescoping member 36. Continued raising of the actuator 42 at the handle grip 46 causes the insert pin 50 to move downward, taking the telescoping member 36 with it. This action of the trap arrangement 26 imposes the squeeze force upon the wheel. Responsive to the back pressure exerted by the squeezed wheel on the trap arrangement 26 and bracing arrangement 62, the gripped end of the actuator 42 is biased downward. This movement, however, is resisted through the support portion 66 of the bracing arrangement 62 by essentially fixed location of the paw member 74 on the ratchet teeth 72. The paw member 74 is maintained in an engaged relationship with the ratchet teeth 72 by the downward pressure of the support portion 66 that is applied on the paw member 74 at the offset location with respect to the positioning pin arrangement 80 upon which the paw 74 pivots. The configuration defines the trap space 24 about the wheel 14 and establishes a securing pressured engagement by the carrier 16 upon the wheel 14.

To release the bicycle 12 from the trap space 24, the user relieves the back pressure on the support member 68 imposed by the reactionary spring force of the wheel assembly 14 by raising the left-hand end of the actuator 42 at the handle grip 46. The support member 68 may then be moved toward the rear or left end of the tray 22. This permits the left-hand end of the actuator 42 to drop down, thereby raising the insert pin 52 at the opposite end thereof. This action causes the telescoping member 36 to move upward in the sleeves 32 thereby relieving the squeeze force off the wheel 14.

The bracing arrangement 62 is then transitioned downward into the position in which the wheel is engaging portion 64 fits into the wheel tray 22. The bicycle 12 can then be rolled out of the trap space 24 and removed from the carrier 16. If desired, the trap arrangement 26 may be then folded back toward the left so that the carrier's vertical profile above the vehicle is minimized.

An anchor arrangement 82 of the carrier 16 includes the base plate 84 to which at least the sleeves 32 are pivotally engaged. A securing arrangement 86 is established for releaseably fixing the base plate 84 to load bar 10 of the vehicle's rack system. In a preferred embodiment, two flip handles 88 are provided, each having cam lobe portion 90 at one end thereof. The handle 88 is configured for pivoting action, and the cam lobe 90 is arranged to lift or tighten a tightenable securing mechanism 89 about the load bar 10 of the rack system as the handle 88 is pivoted to a fold-down configuration. That is to say, when the handle 88 is in an upright position, the securing mechanism 89 underneath the load bar 10 is relaxed. As the handle 88 is pivoted to a laid-down position, however, the action of the cam lobe 90 against the base plate 84 causes the securing mechanism 89 to be tightened about the load bar 10. A cylinder lock 92 of conventional design is included in the flip handle 88 for locking the handle 88 to the base plate 84 in the tightened configuration.

As described hereinabove, typical bicycle design entails at least one front wheel 14 being easily removed. Therefore, it is contemplated that a locking cable 15 maybe snaked through the components of bicycle 12 and secured by a cable lock 94 at one or both of the flip handles 88.

From a consumer perspective, it is important that only one key be required for unlocking the several locks on a particular carrier 16. Therefore, a dual action lock may be incorporated into the flip handle 88 for simultaneous securement of the base plate 84 to the load bar 10 of the rack system, while at the same time receiving and locking down the securement cable 15 connected to the bicycle 12. Alternatively, two locks may be utilized, but those locks are commonly keyed so that a single key may be utilized for unlocking procedures. Both locks may be included in the flip handle 88, or the cable 15 may be locked at another location on carrier 16.

Figure 8:
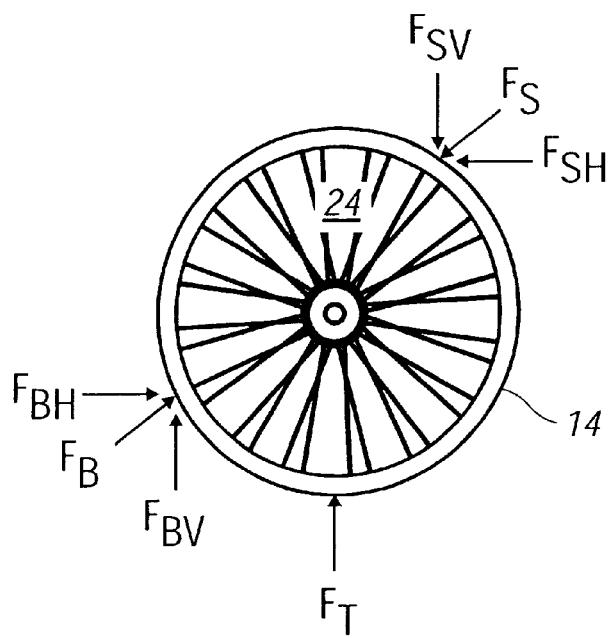
FIG. 8 is a force diagram illustrating the trap forces experienced upon the bicycle wheel depicted in FIG. 1.

FIG. 8 shows the various imposed upon wheel 14 by the combination of the trap arrangement 26 and the bracing arrangement 62 about the perimeter of the trap space 24. The "F" designators indicate the several forces. The subscript "S" denoted the squeeze force, the subscript "B" denoted the brace force and the subscript "T" denotes the tray force. The subscript "V" denotes a vertically directed force component and the subscript "H" denotes a horizontally directed force component.

A method and apparatus for providing an upright, roof-mount carrier system has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A bicycle carrier for securing a wheel of a bicycle, said bicycle carrier comprising:
   a base portion for supporting a bicycle;
   a trap arrangement having a trap space, said trap space being configured to receive the wheel of the bicycle therein, and an extension member coupled to said base portion and comprising two leg portions; and
   a macro-adjustment member slidably coupled to the trap arrangement, said macro-adjustment member being configurable for applying a securing force onto the wheel of the bicycle in a securing configuration thereby securing the bicycle to said load carrier.

2. The bicycle carrier of claim 1 wherein said two leg portions have substantially equal lengths.

3. The bicycle carrier of claim 1 wherein said extension member comprises a bite portion at a distal end of said extension member with each said leg portions being connected to said bite portion.

4. The bicycle carrier of claim 3 wherein said bite portion is substantially U-shaped.

5. The bicycle carrier of claim 1 wherein said extension member is telescopically adjustable.

6. The bicycle carrier of claim 1 further comprising sleeves, each sleeve configured for receiving an end of a leg portion.

7. The bicycle carrier of claim 6 further comprising a spring configured to bias the extension member within each sleeve thereby assuring a relative position between the extension member sleeves.

8. The bicycle carrier of claim 1 further comprising two actuators operatively connected to said macro-adjustment member, said actuators configured to cause said macro-adjustment member to apply a squeeze force onto the wheel of the bicycle.

9. The bicycle carrier of claim 8 further comprising a pivoting paw member operatively connected to said actuators, said pivoting paw member further comprising an actuatable portion and configured to engage with an engaging portion on an underside of said bicycle carrier.

10. The bicycle carrier of claim 9 wherein said squeeze force being applied by said macro-adjustment member comprises a vertical force.

11. The bicycle carrier of claim 9 wherein said squeeze force being applied by said macro-adjustment member comprises a horizontal force.

12. The bicycle carrier of claim 1 wherein said macro-adjustment member is slidably coupled to each leg portion of said extension member.

13. The bicycle carrier of claim 1 wherein said macro-adjustment member further comprises and adjustable selection apparatus configured to engage with each leg portion.

14. The bicycle carrier of claim 1 wherein each leg portion comprises a plurality of indicated discreet locations with each location corresponding to a different sized bicycle wheel thereby allowing the macro-adjustment member to be positioned to apply the securing force upon differently sized bicycle wheels in the securing configuration.

15. The bicycle carrier of claim 14 wherein said macro-adjustment member further comprises an adjustable selection apparatus configured to engage with leg portion at an indicated discreet location.

16. The bicycle carrier of claim 1 wherein said leg portions comprise a plurality of pairs of indicated discreet locations with each leg portion having one indicated discreet location of a corresponding pair of indicated discreet locations, each pair of indicated discreet locations being located to accommodate a different sized bicycle wheel.

17. The bicycle carrier of claim 16 wherein said macro-adjustment member further comprises an adjustable selection apparatus configured to engage with each leg portion at a corresponding pair of indicated discreet locations.

18. The bicycle carrier for securing a wheel of a bicycle, said bicycle carrier comprising:
   a base portion for supporting a bicycle;
   a trap arrangement having a trap space, said trap space being configured to receive the wheel of the bicycle therein, and an extension member coupled to said base portion and comprising two leg portions;
   a macro-adjustment member slidably coupled to the trap arrangement, said macro-adjustment member being configurable for applying a securing force onto the wheel of the bicycle in a securing configuration thereby securing force onto the wheel of the bicycle.

19. The bicycle carrier of claim 18 wherein said wheel engaging portion is configured so that the bicycle receiving configuration, at least a portion of the wheel engaging portion fits substantially flush within a wheel receiving tray thereby permitting rolling access of the wheel into the trap space.

\* \* \* \* \*